(12) United States Patent
Edsall

(10) Patent No.: US 10,039,982 B2
(45) Date of Patent: Aug. 7, 2018

(54) ARTIST-DIRECTED VOLUMETRIC DYNAMIC VIRTUAL CAMERAS

(71) Applicant: MICROSOFT TECHNOLOGY LICENSING, LLC, Redmond, WA (US)

(72) Inventor: Gerald Edsall, West Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/446,309

(22) Filed: Mar. 1, 2017

(65) Prior Publication Data

US 2017/0173468 A1 Jun. 22, 2017

Related U.S. Application Data

(62) Division of application No. 14/261,173, filed on Apr. 24, 2014, now Pat. No. 9,616,339.

(51) Int. Cl.
A63F 13/525 (2014.01)

(52) U.S. Cl.
CPC .................. *A63F 13/525* (2014.09)

(58) Field of Classification Search
CPC ........ A63F 13/525; A63F 13/40; A63F 13/60; A63F 2300/60
USPC ........................................................ 463/31
See application file for complete search history.

(56) References Cited

U.S. PATENT DOCUMENTS

| | | |
|---|---|---|
| 6,856,319 B2 | 2/2005 | Rose, III et al. |
| 7,024,279 B2 | 4/2006 | Rose, III et al. |
| 7,753,785 B2 | 7/2010 | Nishimura |
| 8,014,985 B2 | 9/2011 | Clavadetscher |
| 8,414,393 B2 | 4/2013 | Tarama et al. |
| 2004/0219980 A1 | 11/2004 | Bassett et al. |
| 2010/0111370 A1 | 5/2010 | Black |
| 2011/0242326 A1 | 10/2011 | Essa |

(Continued)

OTHER PUBLICATIONS

He et al., "The Virtual Cinematographer: A Paradigm for Automatic Real-Time Camera Control and Directing", Proceedings: In Proceedings of the 23rd Annual Conference on Computer Graphics and Interactive Techniques, Jan. 1996 (8 pages total).

(Continued)

*Primary Examiner* — Allen Chan
(74) *Attorney, Agent, or Firm* — Mark K. Young; Mayer & Williams PC

(57) ABSTRACT

A volumetric dynamic virtual camera system employs a radial basis function (RBF) component that can utilize non-uniform training datasets that are blended to provide interpolated camera parameters during application runtime based on a player's position within virtual volumes in a 3D space. During application development, an artist or developer can interactively author cameras that are finely tuned to appear just right and which provide the training data for runtime. The RBF component blends the training data during runtime as the player's position within the volume changes to produce camera parameters that the camera system uses to capture scenes for rendering on a display device. The result is an overall camera system that lets authors very quickly develop film-quality cameras that appear and behave more like fully dynamic cameras having significant intelligence. The cameras are volumetric because they can exist in all the virtual spaces exposed by the application.

20 Claims, 20 Drawing Sheets

(56) References Cited

U.S. PATENT DOCUMENTS

2014/0085293 A1    3/2014  Konoplev
2014/0195988 A1    7/2014  Kramer

OTHER PUBLICATIONS

Tatarchuk et al., "Artist-Directable Real-Time Rain Rendering Time Rain Rendering in City Environments", Proceedings: In the ACM SIGGRAPH Courses, Jul. 2006 (1 page total).
Paolo Burelli, "Interactive Virtual Cinematography", Proceedings: A Thesis Submitted for the Degree of Doctor of Philosophy, Apr. 2004 (154 pages total; uploaded as 2 separate documents due to size).
"Autodesk Maya 2011: Getting Started", Published on: Jan. 2011 Available at: http://images.autodesk.com/adsk/files/gettingstartedmaya2011.pdf (1044 pages total; submitted in 7 parts).
Christie, et al., "Camera Control in Computer Graphics", Computer Graphics Forum, vol. 27, Issue 8, (22 Pages total).
"International Search Report & Written Opinion Issued in PCT Application No. PCT/US2015/026050", dated Jul. 7, 2015, (14 Pages total).
Wilkins, Phil, "Designing and Implementing a Dynamic Camera System (with slide notes)", Sony Playstation Entertainment, Feb. 22, 2008, (62 Pages total).
Wilkins, Phil, "Iterating on a Dynamic Camera System", Published on: Mar. 4, 2011 Available at: http://www.gdcvault.com/play/1014606/Iterating-on-a-Dynamic-Camera (144 pages total).

ARTIST-DIRECTED VOLUMETRIC DYNAMIC VIRTUAL CAMERAS

STATEMENT OF RELATED APPLICATIONS

This application is a divisional of U.S. application Ser. No. 14/261,173, field Apr. 24, 2014, entitled, "ARTIST-DIRECTED VOLUMETRIC DYNAMIC VIRTUAL CAMERAS" which is incorporated herein by reference in its entirety.

BACKGROUND

Typical real-time cameras used in virtual three dimensional (3D) spaces used in gaming and other computer-based applications are either fully animated or fully simulated. Fully animated cameras provide comprehensive directability for artists and cinematographers, but suffer from being non-interactive for game players. Fully simulated cameras allow for player interaction, but offer little ability for artists to provide direction. Some advanced camera solutions for simulated cameras allow for artists and engineers to provide limited direction by adding constraints such as splines or look-at targets. These solutions tend to be highly technical and tricky to use. They often require complex level scripting to dynamically change camera constraints.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A volumetric dynamic virtual camera system employs a radial basis function (RBF) component that can utilize non-uniform training datasets that are blended to provide interpolated camera parameters during application runtime based on a player's position within virtual volumes in a 3D space. During application development, an artist or developer can interactively author cameras that are finely tuned to appear just right and which provide the training data for runtime. The RBF component blends the training data during runtime as the player's position within the volume changes to produce camera parameters that the camera system uses to capture scenes for rendering on a display device. The result is an overall camera system that lets authors very quickly develop film-quality cameras that appear and behave more like fully dynamic cameras having significant intelligence. The cameras are volumetric because they can exist in all the virtual spaces exposed by the application.

The training data can be non-uniform and comprise both sparse and dense sets that are created interactively by authors or received from an external application such as a DCC (digital content creation) tool. The training data used by the RBF component can be fine tuned by manually selecting and positioning keyframes from a set of camera samples that define the virtual camera. The training data can also be extrapolated by the RBF component in some cases as the player is moved to volumes that are outside a given defined convex hull. The present volumetric dynamic virtual camera system can be utilized along with traditional camera techniques, for example, those that deal with obstacle and collision avoidance and those techniques implemented by other camera types (e.g., user-controlled, orbital, free, etc.). The system can also drive conventional interactive camera parameters such as distance/offset from the player, field of view, and camera look-direction bias.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
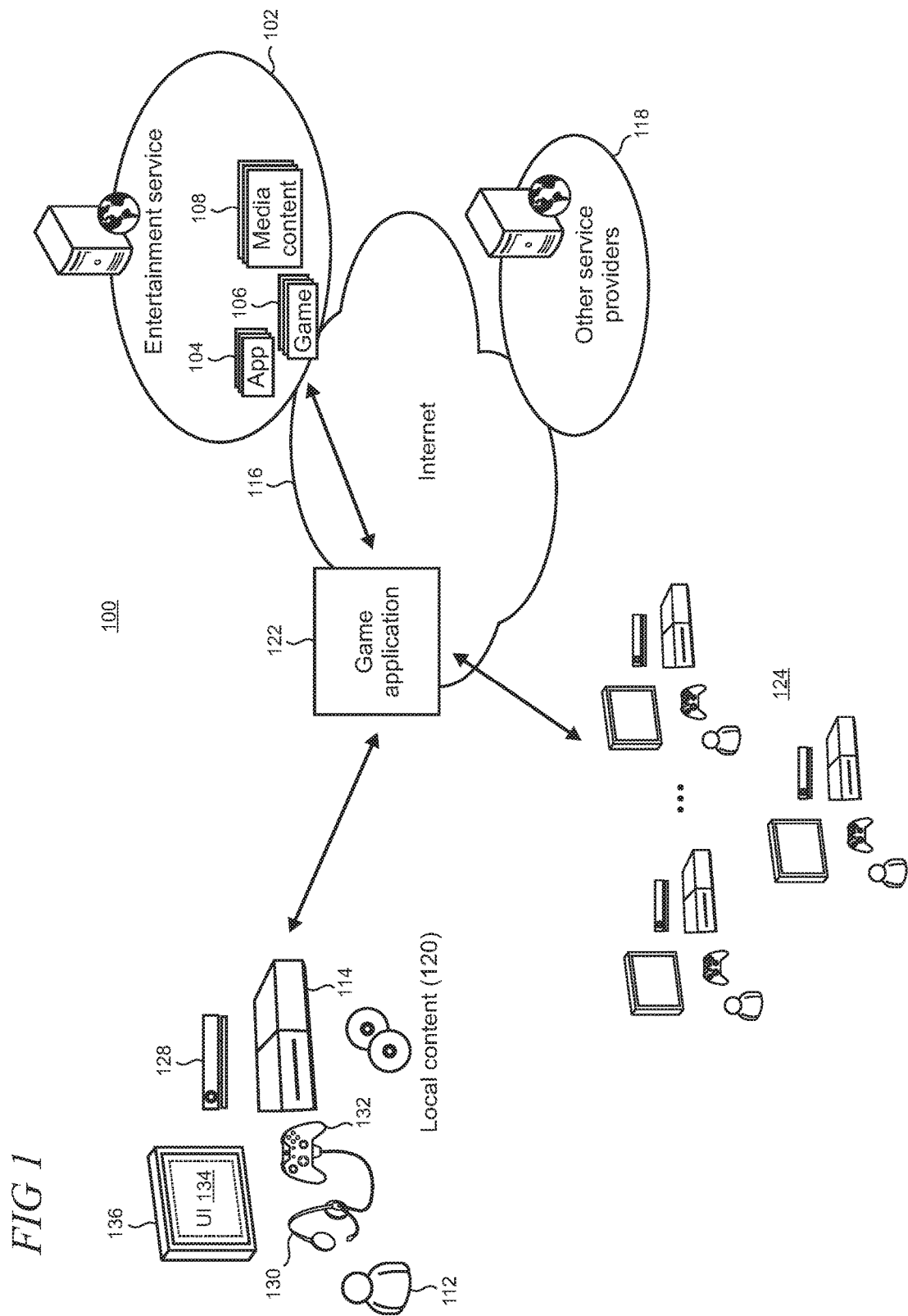
FIG. 1 shows an illustrative computing environment in which the present volumetric dynamic virtual cameras may be implemented.

FIG. 1 shows an illustrative computing environment 100 in which the present volumetric dynamic virtual cameras may be implemented. An entertainment service 102 can typically expose applications ("apps") 104, games 106, and media content 108 such as television shows and movies to a user 112 of a multimedia console 114 over a network such as the Internet 116. Other service providers 118 may also be in the environment 100 that can provide various other services such as communication services, financial services, travel services, news and information services, etc.

Local content 120, including apps, games, and/or media content may also be utilized and/or consumed in order to provide a particular user experience in the environment 100. As shown in FIG. 1, the user is playing a particular game application 122. The game 122 may execute locally on the multimedia console 114, be hosted remotely by the entertainment service 102, or use a combination of local and remote execution in some cases using local or networked content/apps/games as needed. The game 122 may also be one in which multiple other players 124 with other computing devices can participate. Although a game is utilized in the description of the present volumetric dynamic virtual camera system that follows, it is emphasized that the use of the game is illustrative and the system can also be advantageously utilized in various other applications and contexts, including non-game contexts.

Figure 2:
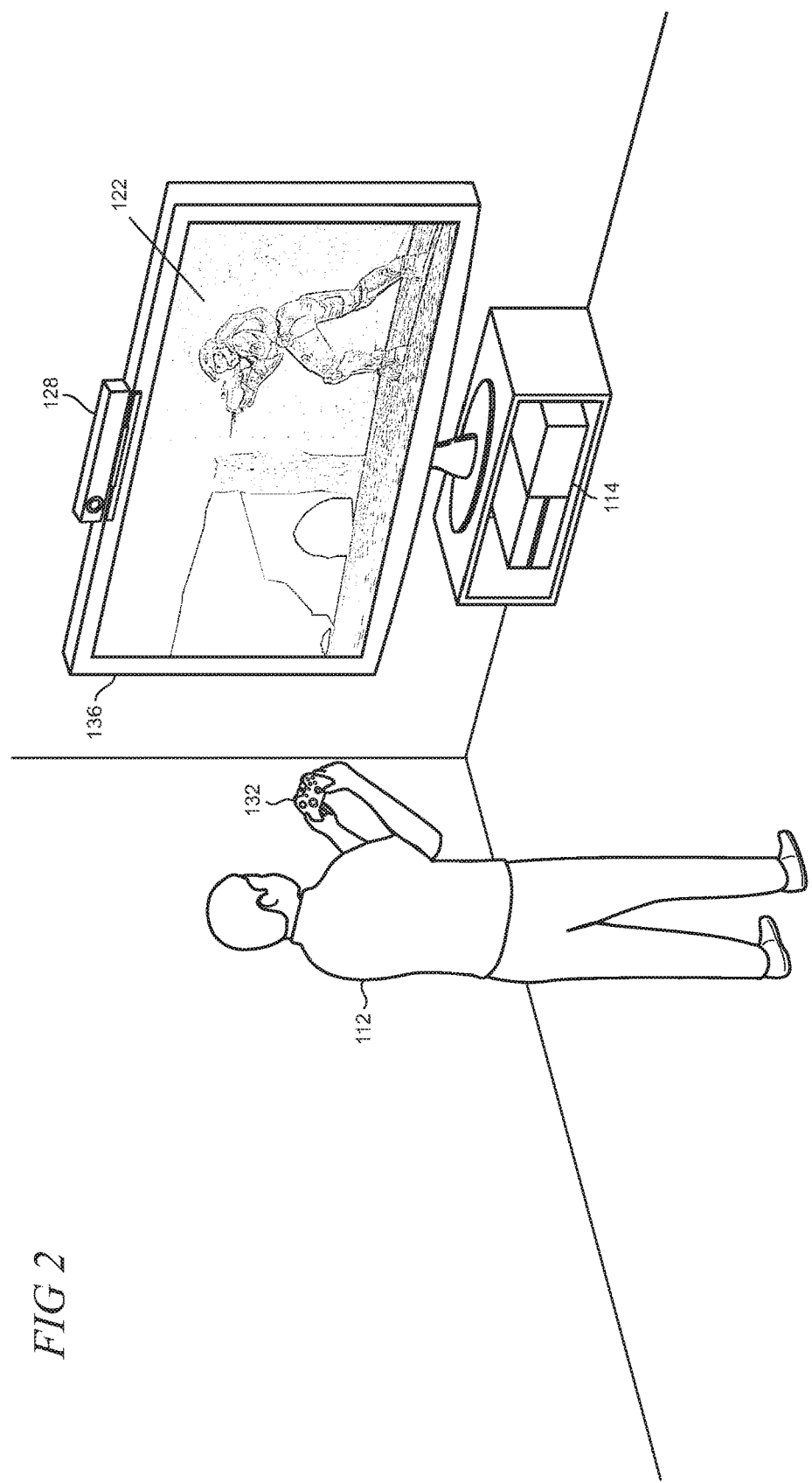
FIG. 2 shows illustrative features that are supported by a gaming application that executes on a multimedia console.

The user 112 can typically interact with the multimedia console 114 using a variety of different interface devices including a camera system 128 that can be used to sense visual commands, motions, and gestures, and a headset 130 or other type of microphone or audio capture device. In some cases a microphone and camera can be combined into a single device. The user may also utilize a controller 132 to interact with the multimedia console 114. The controller 132 may include a variety of physical controls including joysticks, a directional pad ("D-pad"), and various buttons. One or more triggers and/or bumpers (not shown) may also be incorporated into the controller 132. The user 112 can also typically interact with a user interface 134 that is shown on a display device 136 such as a television, projector, or monitor. FIG. 2 shows the user 112 using the controller 132 to interact with the game 122 that is being played on the multimedia console 114 and shown on the display device 136.

Figure 3:
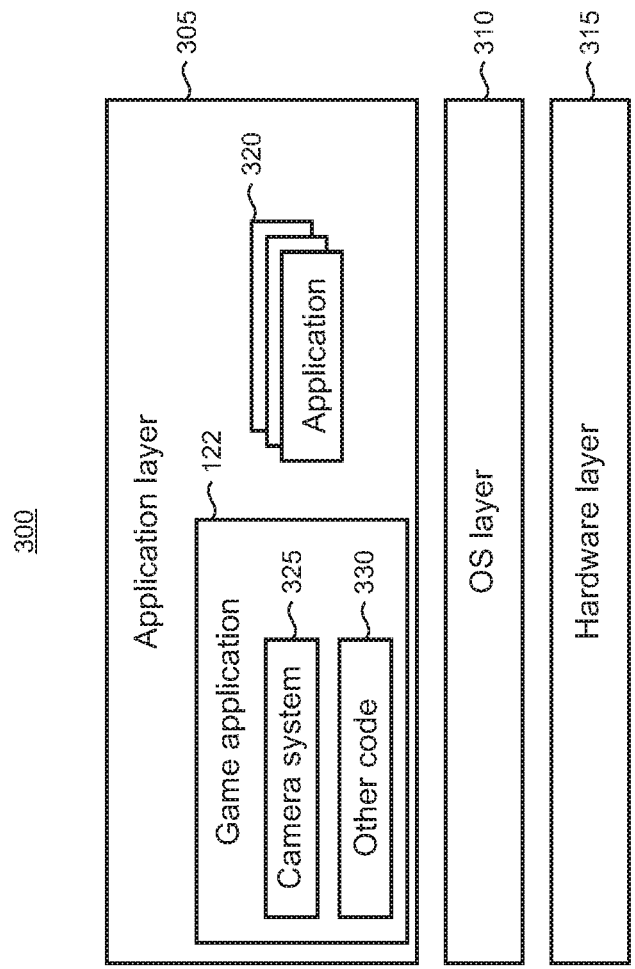
FIG. 3 shows an illustrative layered software architecture that may be used to implement various aspects of the present volumetric dynamic virtual cameras.

As shown in FIG. 3, the multimedia console 114 supports a layered architecture 300 of functional components. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of the various hardware used by the multimedia console 114 (e.g., input and output devices, networking hardware, etc.) to the layers above it.

The application layer 305 in this illustrative example supports various applications 320 as well as the game application 122. The applications 305 and 122 are often implemented using locally executing code. However in some cases, the applications may rely on services and/or remote code execution provided by remote servers or other computing platforms such as those supported by an external service provider such as the service provider 118 and entertainment service provider 102 shown in FIG. 1 and described in the accompanying text. The game 122, in this example, implements and utilizes a camera system 325 that operates under the present principles and supports other code 330 in order to support various user and gaming experiences. In some implementations the camera system will utilize other code, methods and/or resources that are provided by functional components located in the OS layer 310 and/or hardware layer 315.

Figure 4:
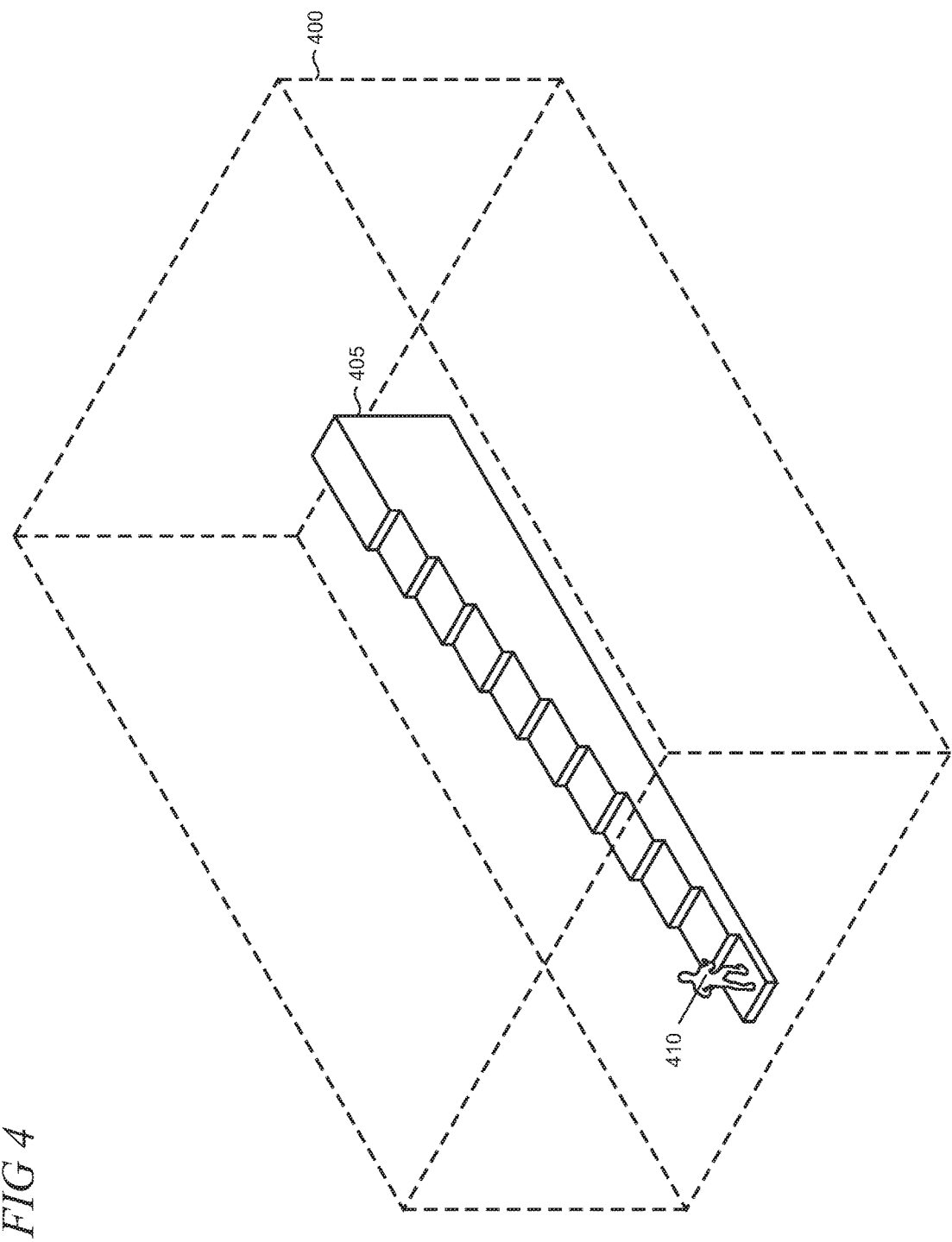
FIG. 4 shows an illustrative three dimensional (3D) virtual game space.

The game 122 typically utilizes one or more virtual game spaces in which the gameplay provided by the application takes place. FIG. 4 shows a bird's eye view of an example of virtual game space 400. As shown, the space 400 is a three dimensional (3D) volume and includes features as part of the game environment such as the stairway 405. The volume 400 is shown having a rectangular shape, but other volume shapes and sizes may also be used in alternative implementations. The game space 400 can also be viewed as a collection of smaller volumes and the terms "volume" and "space" can be used interchangeably. A player 410 is also in the game space 400 under the control of the user 112 (FIG. 1), as shown.

Figure 5:
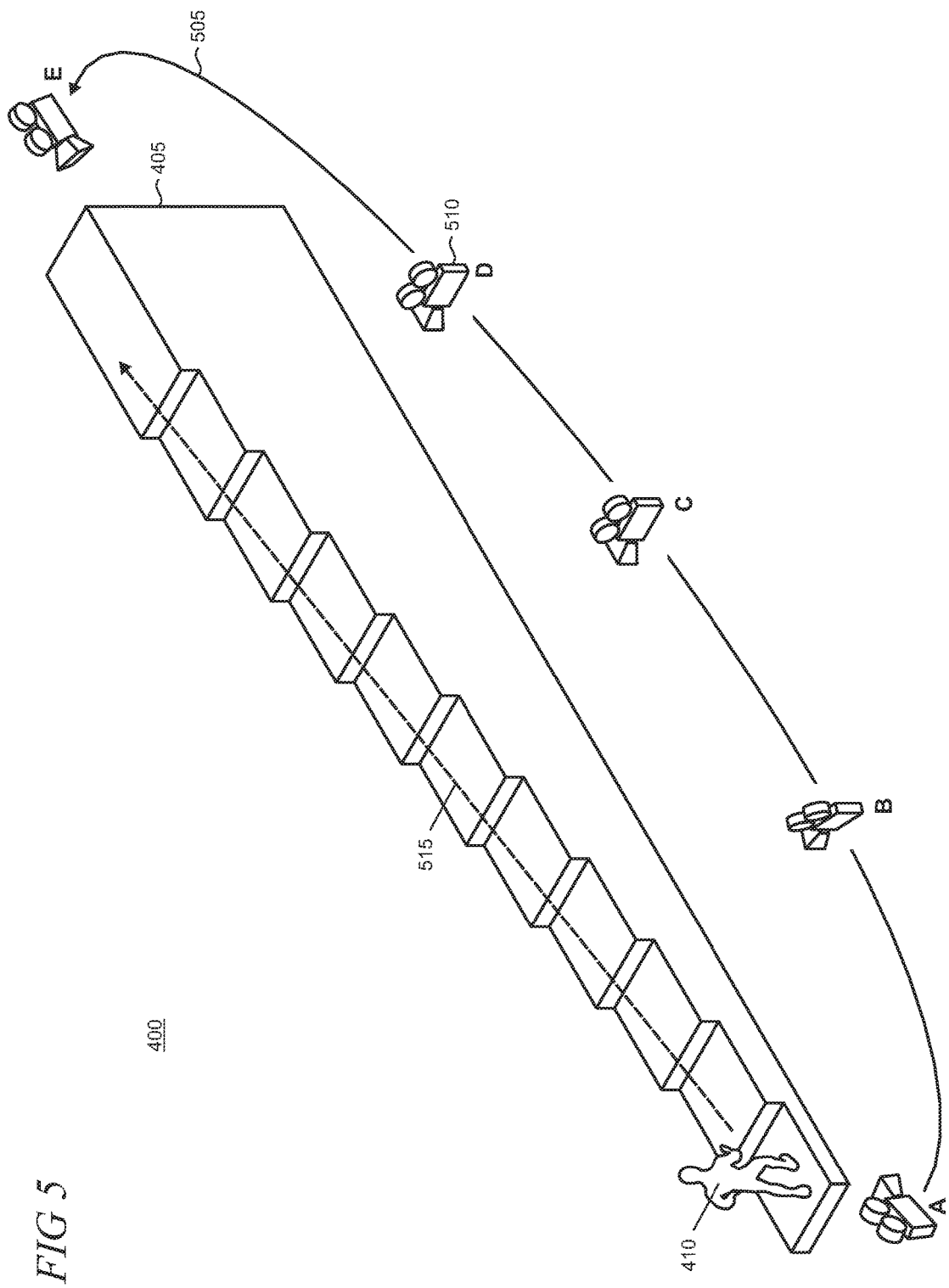
FIG. 5 shows illustrative camera movement along a path as a player moves within a game space.

FIG. 5 shows an example of a typical camera path 505 that is taken by a virtual camera 510 as the user 112 moves the player 410 within the game space 400. That is, the virtual camera 510 moves in a continuous manner along the path to maintain a predetermined relationship with the player's position within the game space along the player's path 515 on the stairway 405. For example, the user 112 could move the player 410 up the stairway as a part of the gameplay experience in which the user explores the game space 400 in a directed manner.

FIGS. 6-10 show a sequence of illustrative screenshots from the display device 136 (FIG. 1) which depict scenes captured by the virtual camera 510 at arbitrary points along the camera path 505. In screenshot 600 in FIG. 6, the virtual camera is positioned in a traditional close up camera angle behind the player and captures a scene of the game space 400 looking up the stairway at point "A" on the camera path 505. As the player moves up the stairway, the virtual camera transitions to a medium shot as it begins to swing around to show the stairway and player from the side at points "B" and "C" on the camera path 505, as respectively shown in the screenshots 700 and 800 in FIGS. 7 and 8.

Figure 9:
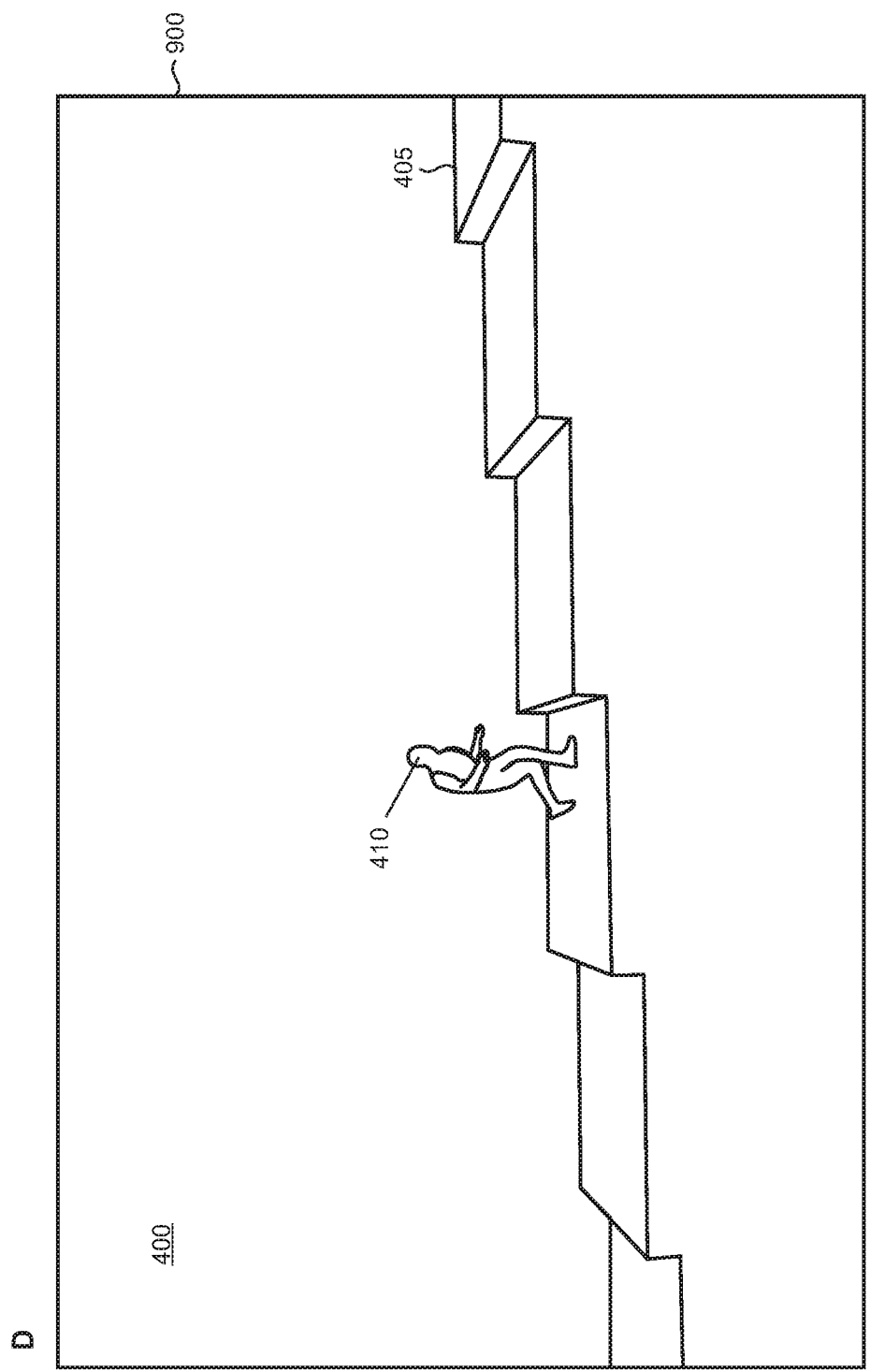
Figure 10:
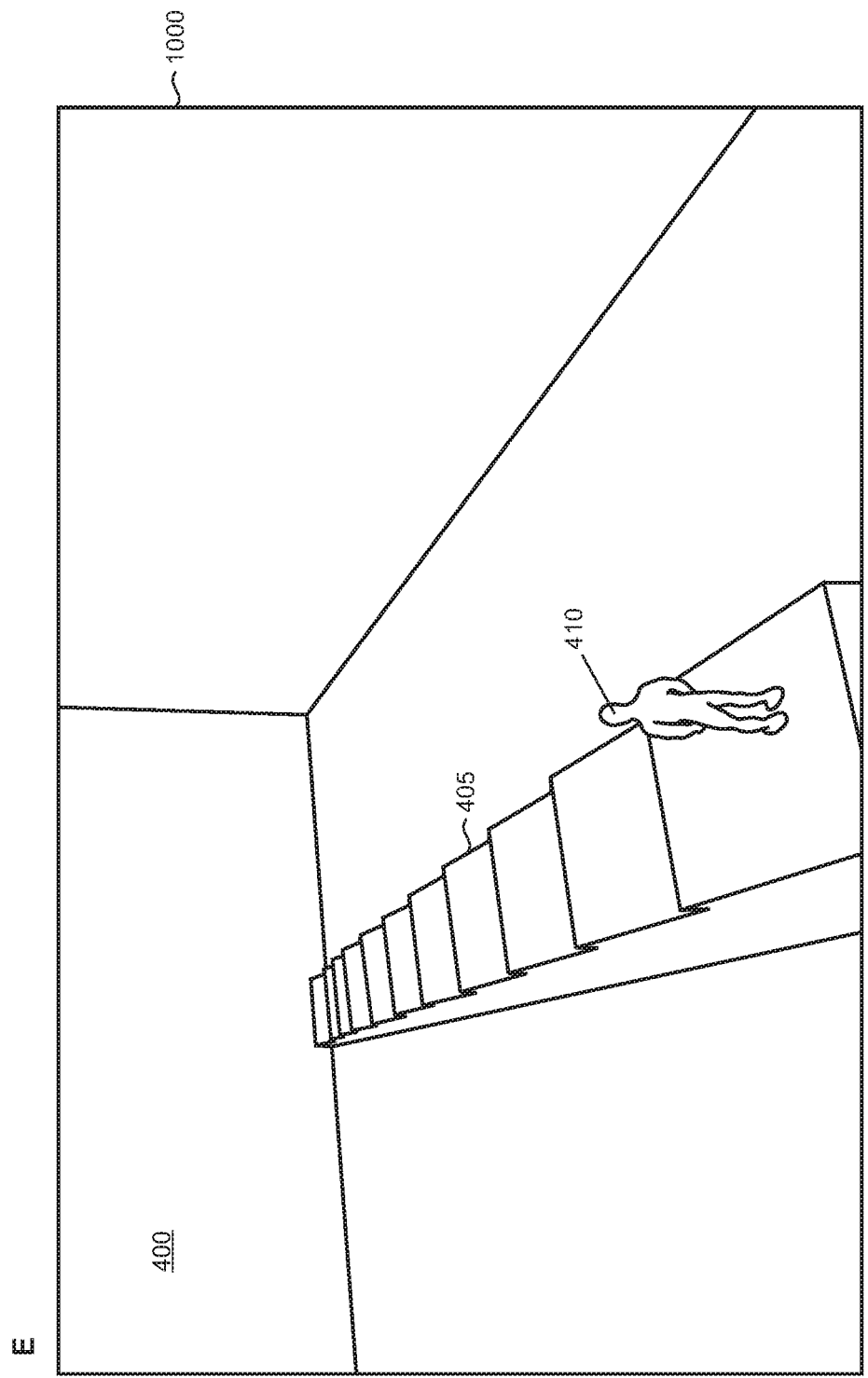

As the player 410 continues up the stairway 405, the virtual camera produces a wider shot of the player and staircase from the side at point "D" on the camera path 505, as shown in screen shot 900 in FIG. 9. When the player 410 moves up to the top of the staircase, the virtual camera moves up and swings around to capture a long shot of the path just traveled by the player at point "E" on the camera path 505, as shown in the screenshot 1000 in FIG. 10.

Using conventional camera systems, authoring the cameras used along the path 505 (FIG. 5) would typically need extensive procedural code to be developed along with complex level scripting to control parameters as the virtual camera moves in the game space and employs various shot compositions. In contrast to such conventional methods which can be cumbersome and time intensive, the present volumetric dynamic virtual camera system enables developers to quickly author film quality cameras. The present cameras are procedural but still allow for artistic input like a traditional animated camera and can work at any location within the game space.

Figure 11:
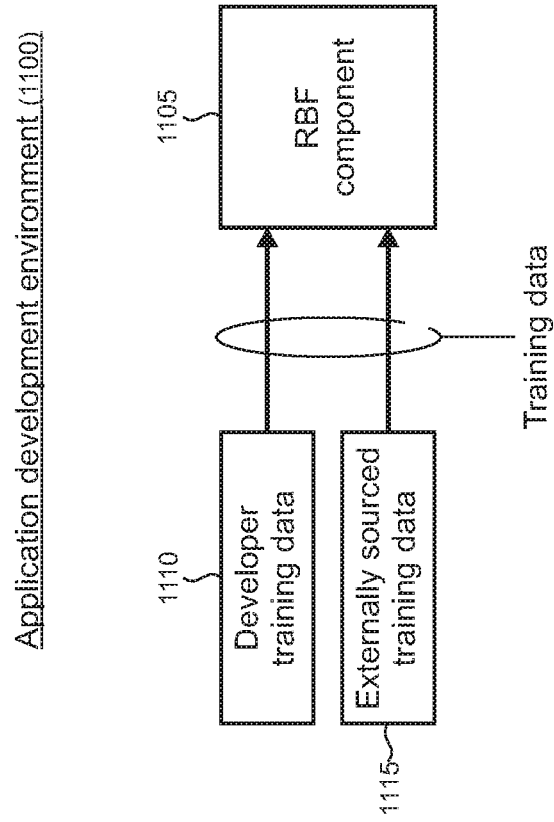
FIG. 11 shows an illustrative radial basis function (RBF) component as utilized in an application development environment.

FIG. 11 shows an illustrative application development environment 1100 that supports camera authoring using an RBF component 1105. Artists, designers, or developers (collectively referred to as "developers") provide input in the form of training data 1110 to the RBF component. The RBF component 1105 uses the training data to generate camera parameters during application runtime which are used by the camera system 325 (FIG. 3) to capture scenes for rendering during gameplay. In addition to developer created training data, training data from external sources (indicated by reference numeral 1115) can also be used to supplement or replace the developer training data 1110 in some implementations. For example, the externally sourced training data 1115 can be generated by DCC tools such as Autodesk Maya® and similar 3D graphics software.

Figure 6:
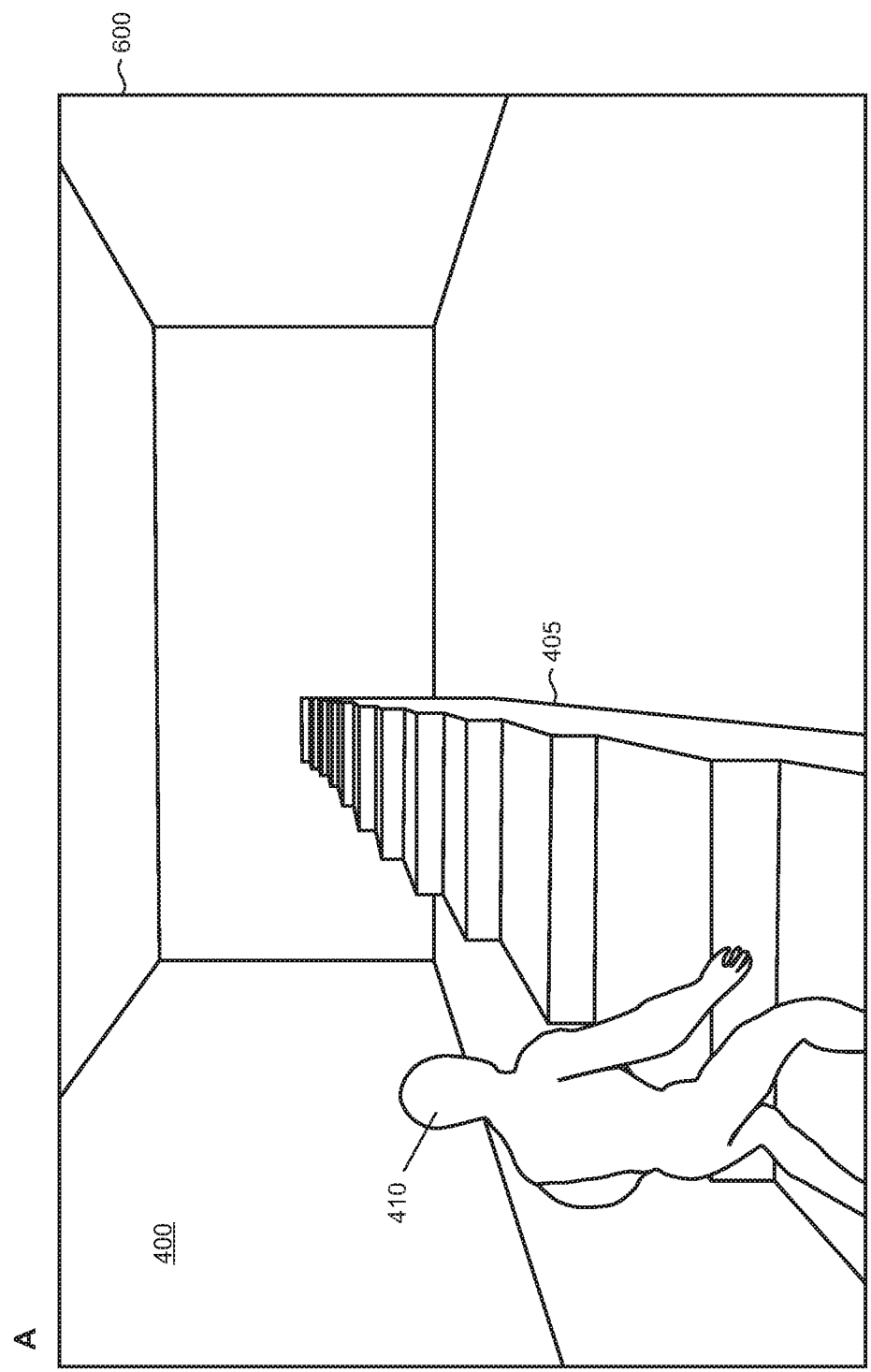
FIGS. 6-10 show a sequence of illustrative screenshots which depict scenes captured by a virtual camera along a path.
Figure 7:
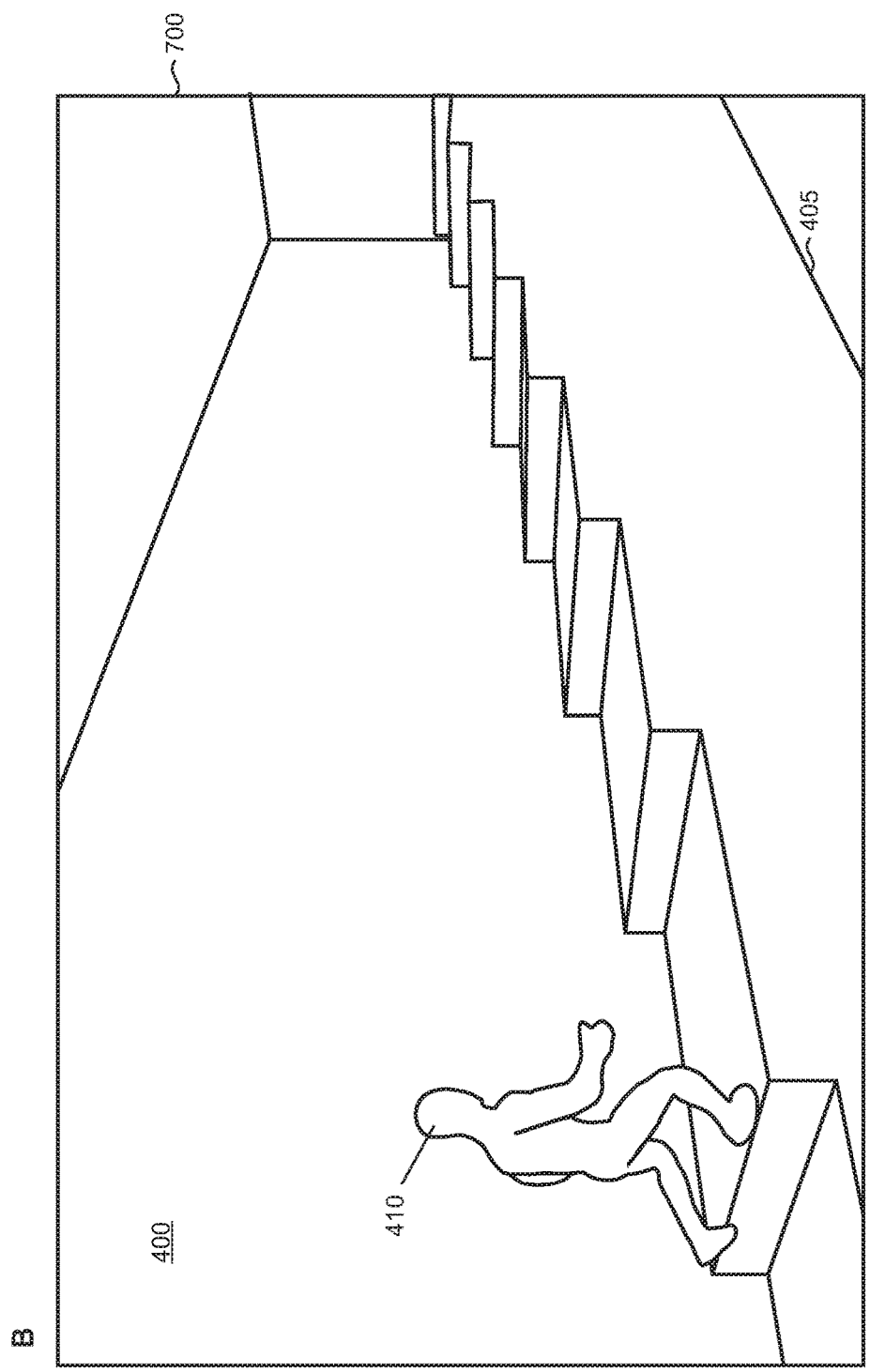
Figure 8:
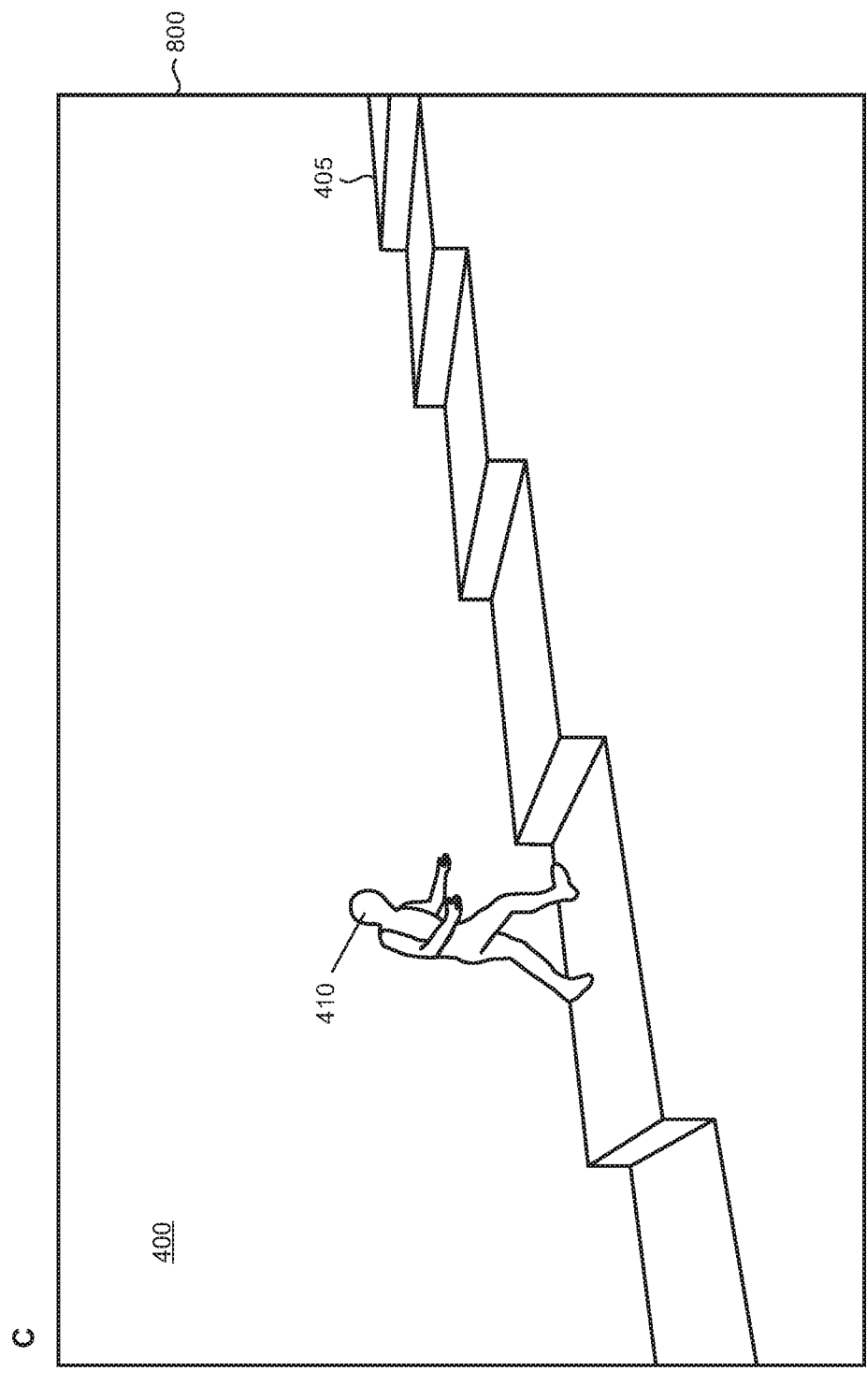

The developer training data 1110 describes how the developer wants the camera to look and operate at various positions in the game space. For example, as shown in FIG. 6, the developer might want the camera to be positioned low and looking up. In other scenarios, the developer may want the camera to follow a player at shoulder level through a doorway and then get low to the ground using a Dutch tilt (i.e., a cinematic shot in which the camera is tilted to one side to convey a dramatic effect). The developer can work through the game space to pick player positions and compose particular camera shots according to the look and effect that the developer wants to achieve during gameplay.

Figure 12:
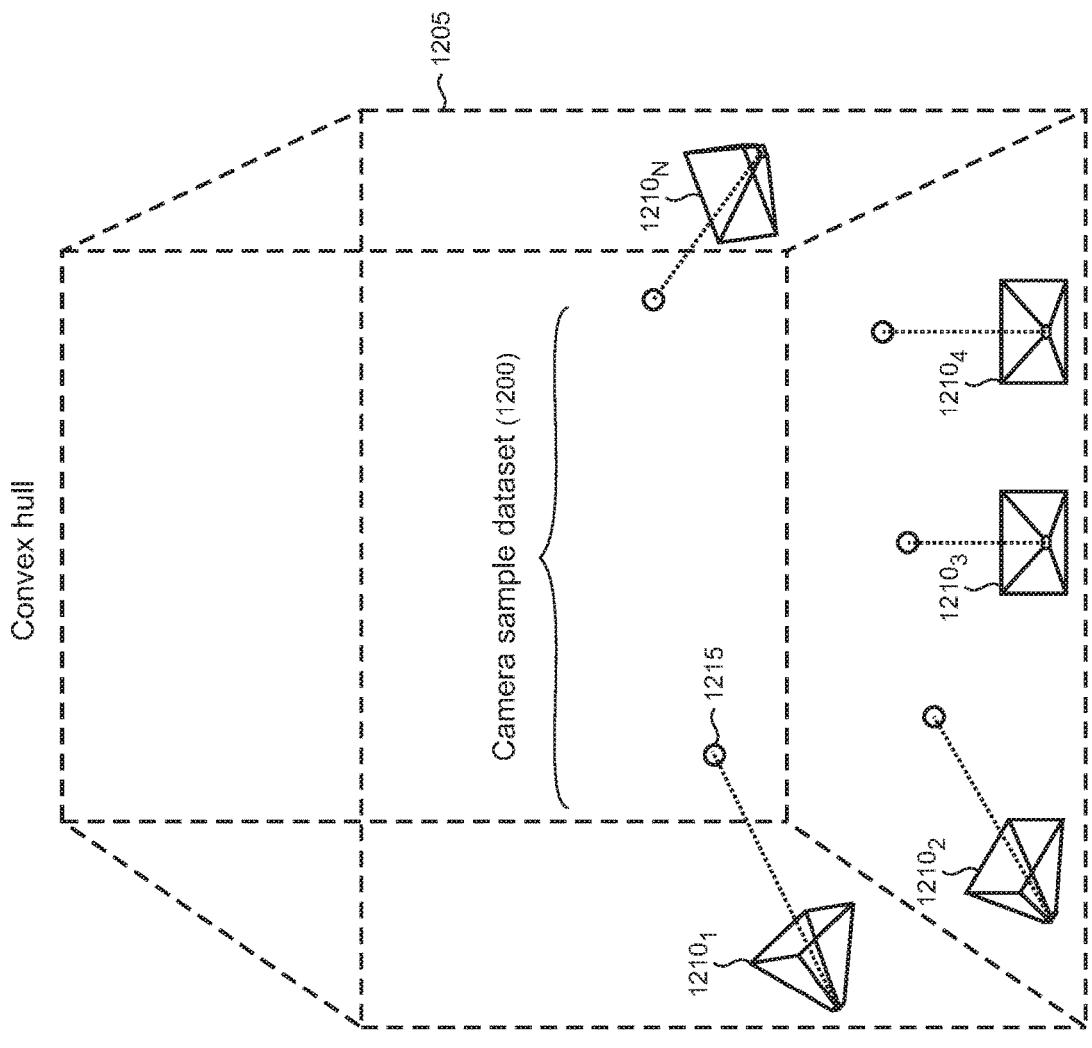
FIG. 12 shows illustrative keyframes that are associated with sample points for which a defined convex hull is fitted.

As shown in FIG. 12, the developer sets down a number of camera samples to define sample points in a camera sample dataset 1200 for which a convex hull 1205 is fitted. The convex hull 1205 provides a portion of the game space in which a particular set of training data is utilized by the RBF component. While the convex hull 1205 is shown as a rectangular volume in FIG. 12 to simply its illustration, it will be appreciated that the convex hull 1205 is the minimal bounding volume that contains all the points in the camera sample dataset 1200 and therefore its shape is arbitrary. During gameplay when the user 112 moves the player 410 within the convex hull 1205, that training dataset is used to drive the camera system according to the developer's input for the particular space. The keyframes $1210_{1-N}$ are each associated with a sample point for a particular player position within the convex hull 1205 as representatively indicated by reference numeral 1215.

In some cases the camera samples and/or keyframes can be generated interactively by the developer while playing the game in a testing or development mode. The developer can use a hotkey or similar tool to indicate when keyframes are set as the developer moves the player's location within the game space. Once the keyframes are set, the developer can go back in, if desired, and edit the cameras by manually selecting and position keyframes from the set of camera samples in order to fine tune the parameters so that the camera system behaves during runtime just like the developer wishes. As noted above, the cameras can be positioned anywhere in the volume and be changed on the fly during gameplay. Thus, the developer can readily utilize any number of cinematic camera shots that can take any desired point of view.

The parameters associated with each keyframe constitute the training data for the camera system for the camera sample dataset 1200. Therefore, the training dataset will typically include multiple data pairs where each pair includes a player position in the space and associated set of camera parameters for that position. The number of keyframes utilized for any given camera sample dataset can vary by implementation. Advantageously, the RBF component is typically configured to perform well even when the training dataset is sparse.

Figure 13:
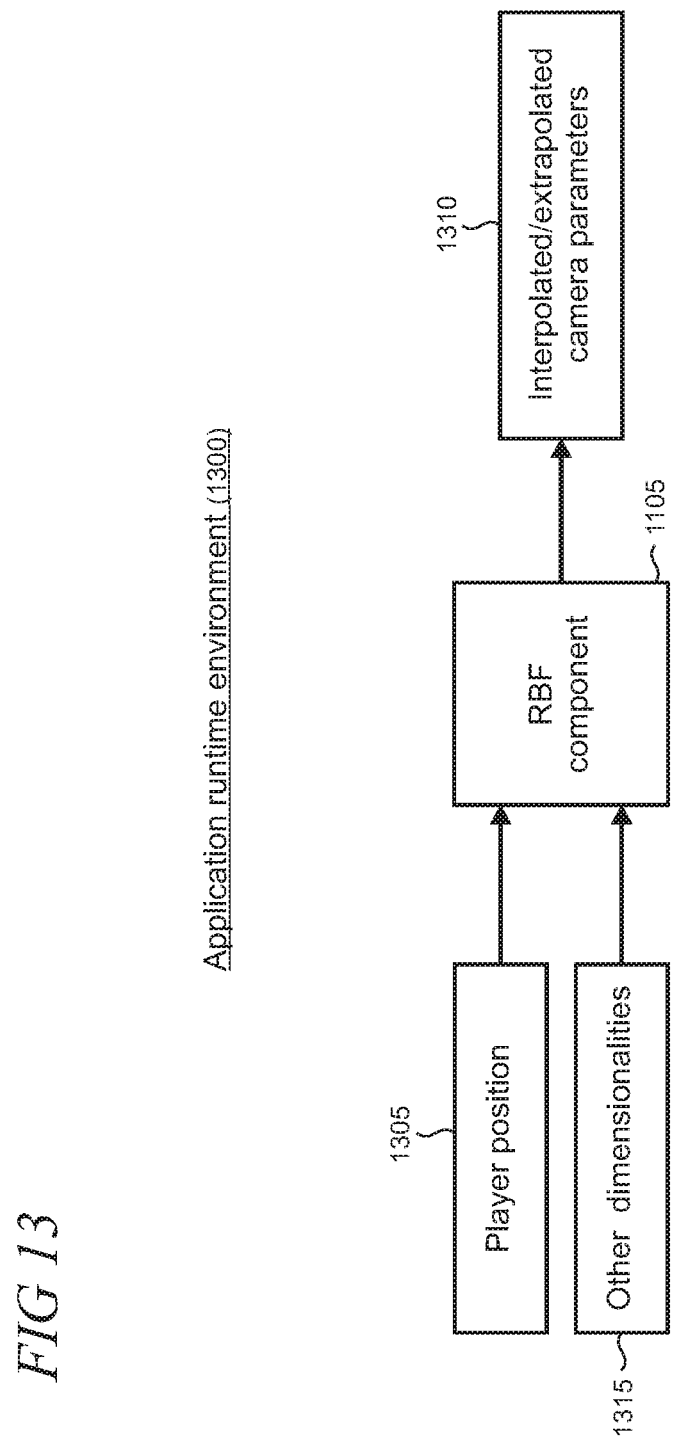
FIG. 13 shows an illustrative RBF component as utilized in an application runtime environment.

FIG. 13 shows an illustrative application runtime environment 1300 that uses the RBF component 1105 to generate interpolated camera parameters during runtime of an application such as the game 122 (FIG. 1). As described in more detail below, extrapolated camera parameters can also be generated in some cases.

The RBF component 1105 typically uses the player's position as an input (indicated by reference numeral 1305) and generates interpolated camera parameters 1310 for that player position as an output. The RBF component 1105 functions to smoothly blend the training data associated with each of the keyframes 1210 (FIG. 12) as the player changes positions in the game space. In key functionality, the RBF component 1105 may use an algorithm that is similar to that described in U.S. Pat. No. 6,856,319 entitled "Interpolation using Radial Basis Functions with Application to Inverse Kinematics" which is assigned to the same assignee as the present application. The disclosure of U.S. Pat. No. 6,856,319 is hereby incorporated by reference having the same effect as if set forth in length herein.

Figure 14:
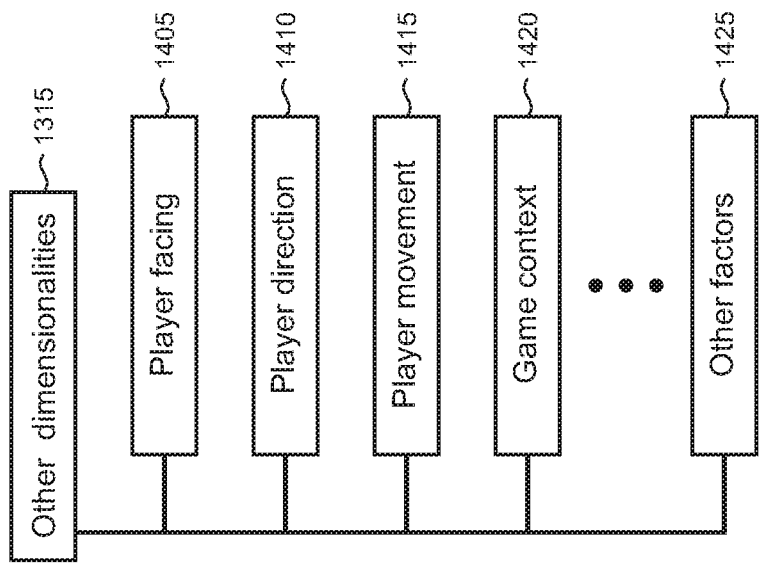
FIG. 14 shows an illustrative taxonomy of dimensionalities that may be utilized as inputs to the RBF component during runtime.

In addition to player position as an input to the RBF component 1105, other dimensionalities 1315 may also be used in some implementations. FIG. 14 shows an illustrative taxonomy of such other dimensionalities which may include which way the player is facing 1405, the player's direction of travel 1410, movement 1415, the context 1420 of the game 122, and other factors 1425. Some or all of the other dimensionalities 1315 can be utilized in any given implementation of the present camera system.

Figure 15:
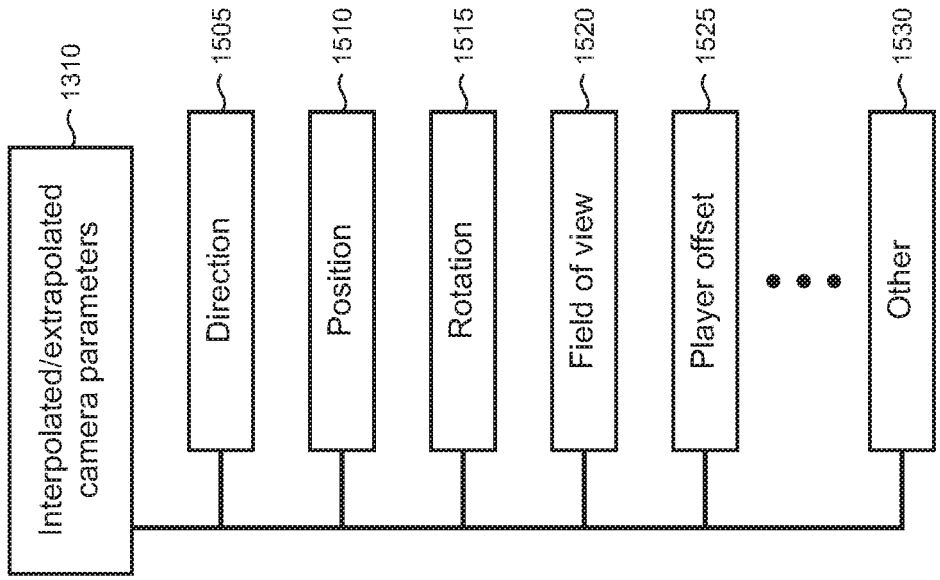
FIG. 15 shows an illustrative taxonomy of interpolated camera parameters that may be generated by the RBF component during runtime.

Various interpolated camera parameters can be generated by the RBF component 1105 depending on the needs of a particular implementation. FIG. 15 shows an illustrative taxonomy of camera parameters 1310 which can be utilized singly or in various combinations as needed. As shown, the camera parameters 1310 include the direction 1505, position 1510, rotation 1515, field of view 1520 of the camera, the player offset 1525 relative to the camera, and other parameters 1530. For efficiency, sampling can be implemented with a regular fixed grid and then interpolated at runtime using tetrahedral barycentric coordinates in 3D, or in 2D on a triangle mesh.

In addition to generating interpolated camera parameters, the RBF component 1105 can also extrapolate training data from a given camera sample dataset to an external volume in which no training data has been generated by the developer. In some cases, the extrapolating functionality can be included with the RBF component 1105 while in other cases, such functionality is separately instantiated in another component that operates independently from the RBF component.

Figure 16:
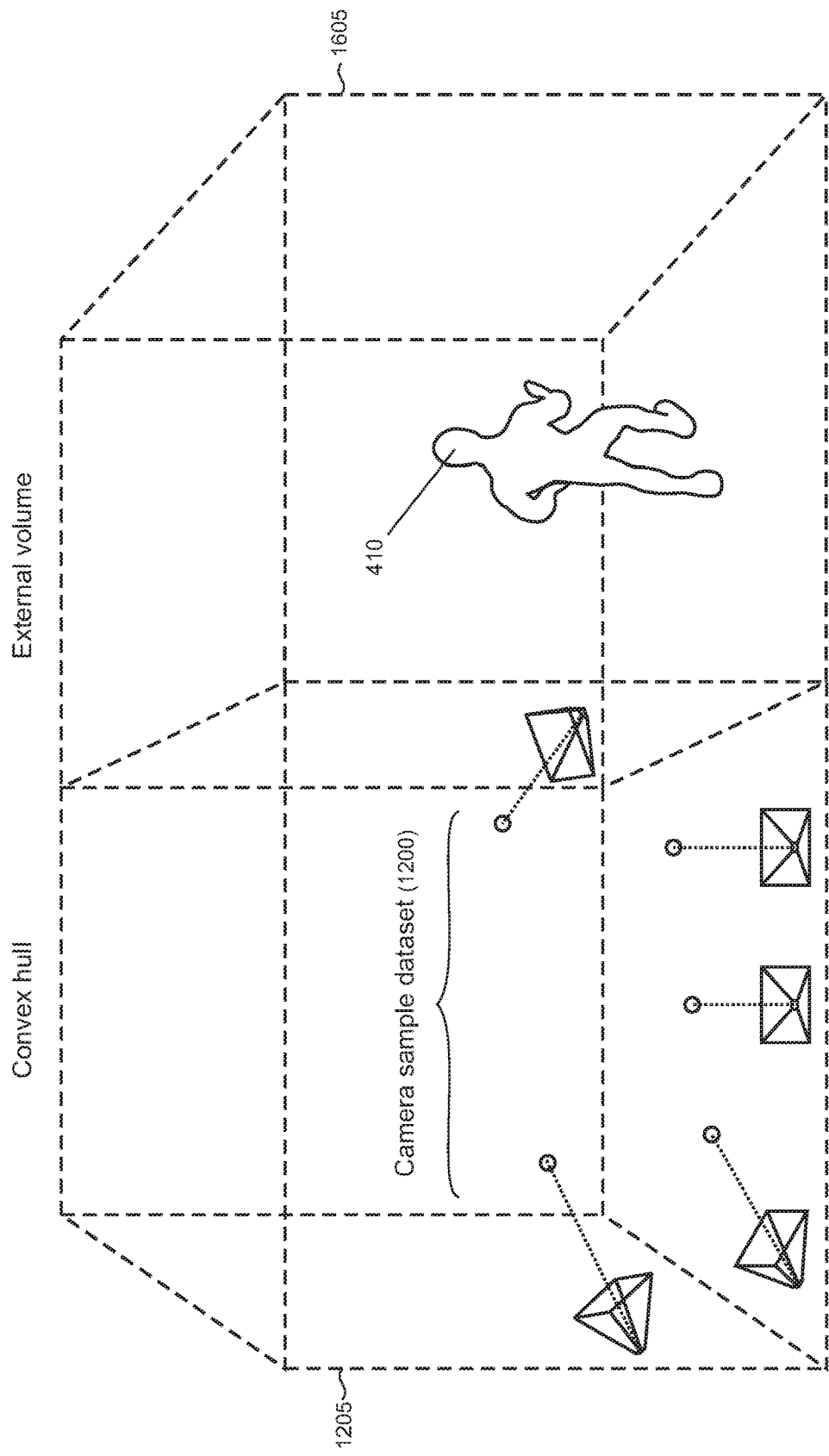
FIG. 16 shows an illustrative convex hull and external volume.

An example extrapolation scenario is shown in FIG. 16 where an external volume 1605 is adjacently located to the convex hull 1205 fitted around the camera sample dataset 1200 for which the developer has selected and positioned keyframes and generated corresponding training data. It will be appreciated that, although the external volume 1605 is depicted as a finite space in FIG. 16, it may comprise any point within the larger game space that is not included in the camera sample dataset. While the external volume 1605 has no keyframes and thus no training data of its own, the training data from the camera sample dataset 1200 can be extrapolated and fed as an input to the camera system when the player 410 is positioned within the external volume and beyond the training dataset boundaries. In many situations, the performance of the camera system using extrapolated parameters can be expected to be entirely satisfactory.

In some camera system implementations, additional constraints may be imposed to control which training data is allowed to be interpolated or extrapolated or how camera parameters are utilized by the camera system. For example, rotation parameters are not expected to extrapolate well. To deal with this situation, a camera heading may be broken into a pitch yaw vector (that interpolates and extrapolates well using the RBF functionality) along with a roll parameter that is separately handled. Camera position and rotation parameters can be additionally subjected to constraints during runtime so that they are implemented in a relative relationship to the player to reduce the impact of interpolation errors. Similarly, the composition of the screen space may be constrained in some cases so that the camera is constrained to the player on the screen. Look-at constraints and other path constraints may also be advantageously applied in some cases, for example, as a camera traverses a spline.

Figure 17:
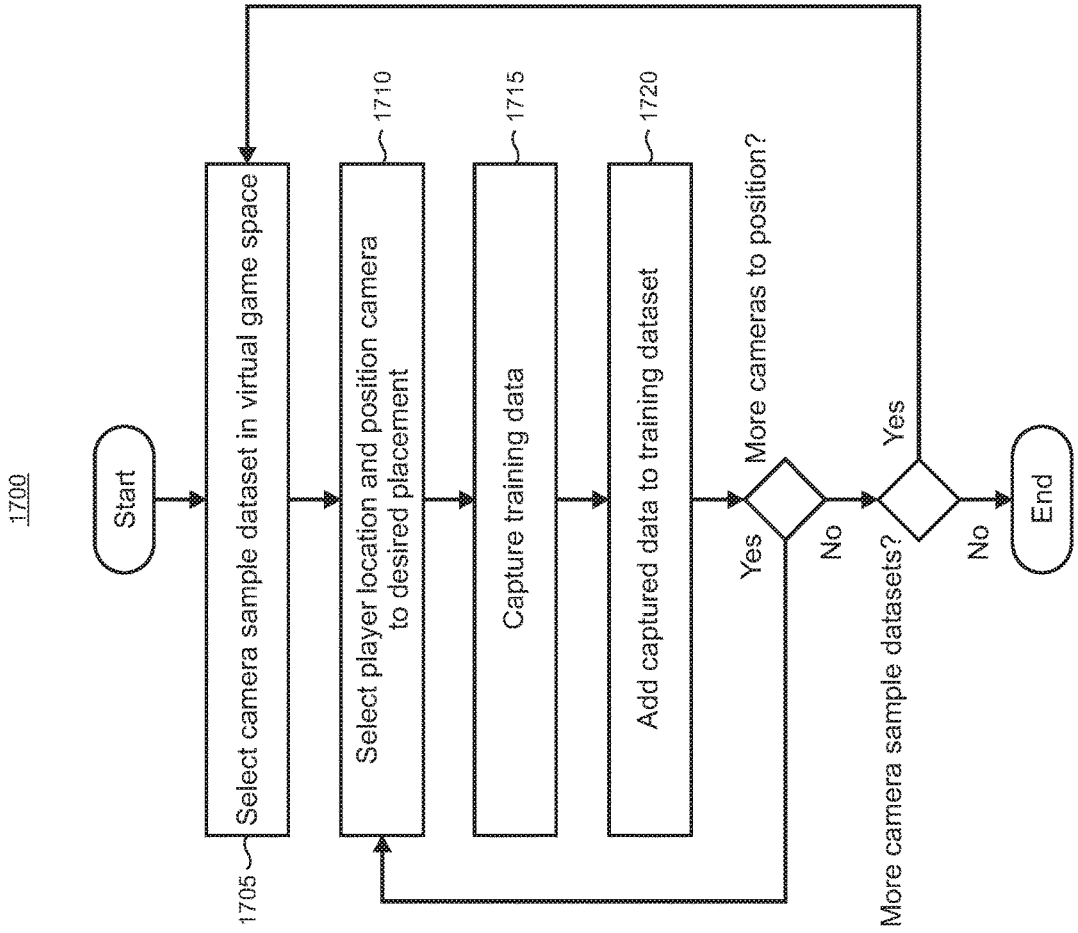
FIG. 17 is a flowchart of an illustrative method for capturing training data used by the RBF component.

FIG. 17 is a flowchart of an illustrative method 1700 for capturing training data in an application development environment that is used by the RBF component 1105 (FIG. 11). Unless specifically stated, the methods or steps shown in the flowchart and described below are not constrained to a particular order or sequence. In addition, some of the methods or steps thereof can occur or be performed concurrently and not all the methods or steps have to be performed in a given implementation depending on the requirements of such implementation. Some methods or steps may also be optionally utilized.

In step 1705, the developer selects a camera sample dataset that is used in a virtual game space. In step 1710, the developer selects a player location anywhere in the scene and positions a camera to a desired placement (where the convex hull expands to contain the new sample point). Training data comprising the parameters associated with the placed camera are then captured in step 1715 and added to the training dataset in step 1720. The steps 1710, 1715, and 1720 are iterated for each keyframe that is utilized for the camera sample dataset and for any other camera sample dataset of interest. As discussed above, these steps can also be performed interactively in some cases and then the resulting parameters can be edited or tweaked as needed (not shown in FIG. 17).

Figure 18:
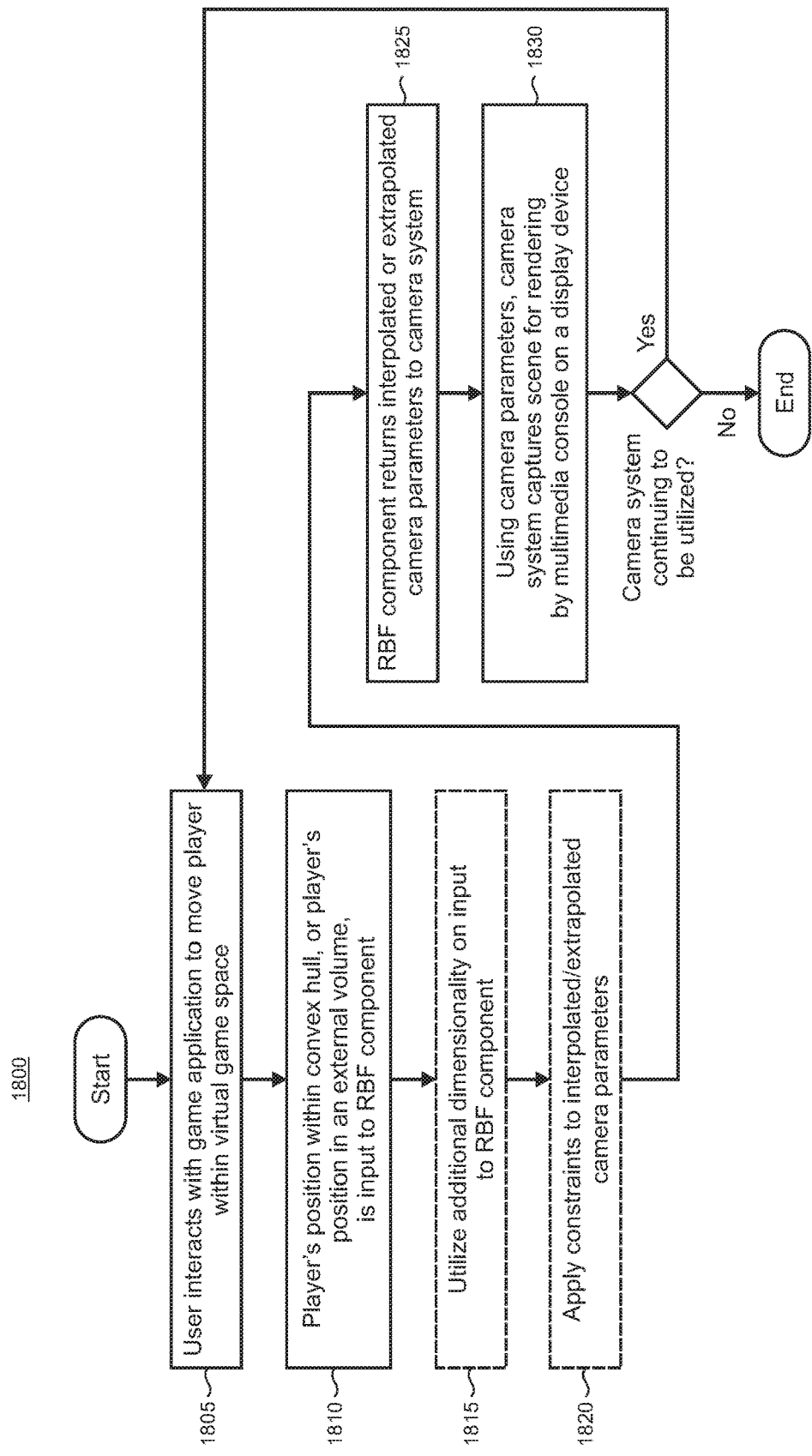
FIG. 18 is a flowchart of an illustrative method for generating interpolated or extrapolated camera parameters during application runtime.

FIG. 18 is a flowchart of an illustrative method 1800 for generating interpolated or extrapolated camera parameters during application runtime. During gameplay in step 1805 the user 112 (FIG. 1) moves the player within the virtual game space. In step 1810, the player's position within a given convex hull fitted around a camera sample dataset, or the player's position in an external volume (i.e., a volume that does not have training data associated with it), is input into the RBF component 1105 (FIG. 11). Optionally, as indicated by the dashed line in step 1815, one or more dimensionalities shown in FIG. 14 and described in the accompanying text may be used as additional input to the RBF component. Additional constraints may also be optionally utilized in step 1820 to control which parameters are interpolated or extrapolated (e.g., rotation parameters) or to otherwise control the camera (e.g., look-at and spline constraints).

In response to the input, the RBF component returns interpolated camera parameters (or extrapolated parameters when the player is an external volume) to the camera system 325 (FIG. 3) in step 1825. The camera system captures the player in the scene according the camera parameters provided by the RBF component and the scene is rendered by the multimedia console 114 (FIG. 1) on the display device in step 1830. The steps are 1805-1830 are iterated so long as the camera system is being utilized by the game.

Figure 19:
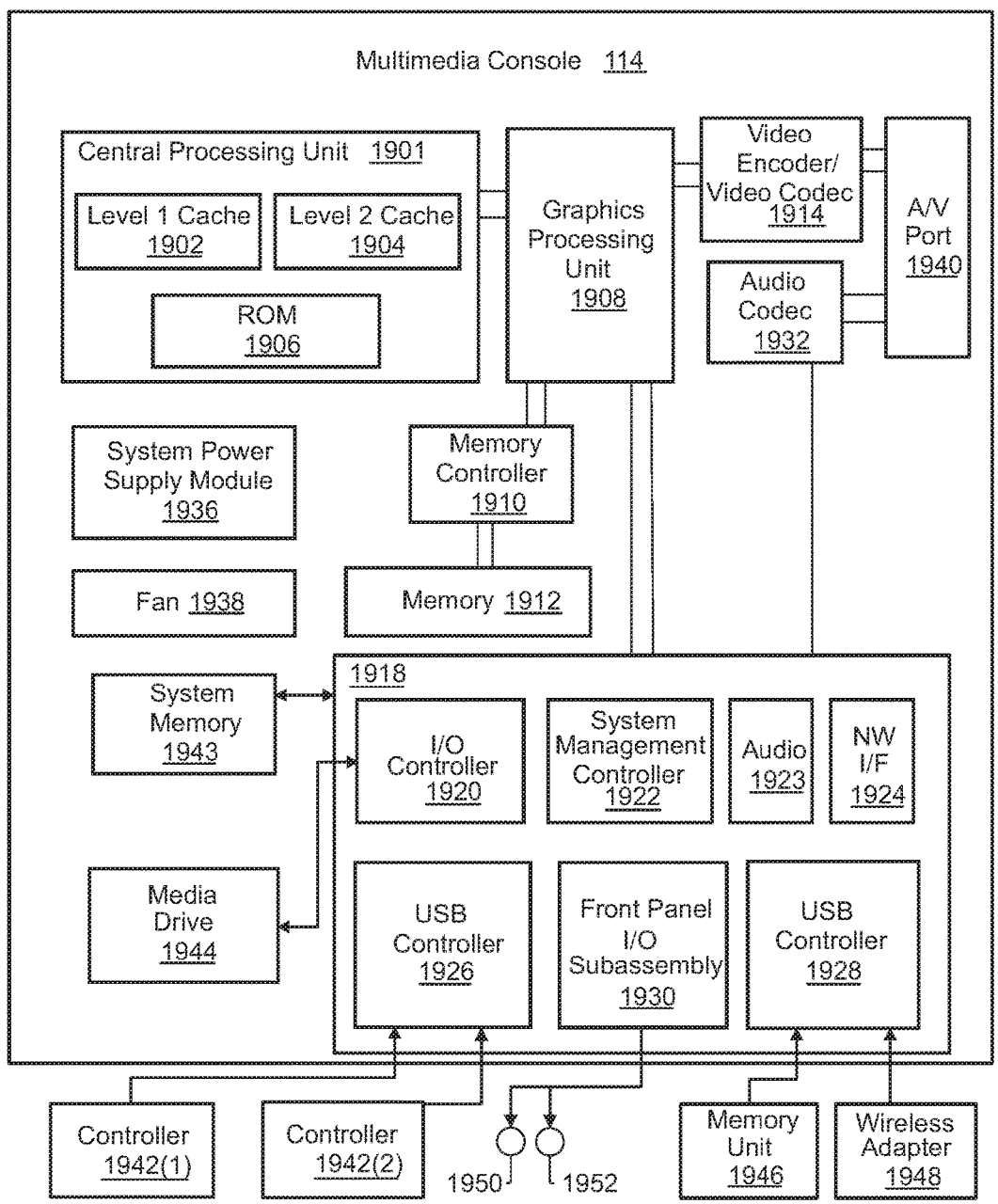
FIG. 19 shows a block diagram of an illustrative computing platform that may be used in part to implement the present volumetric dynamic virtual cameras.

FIG. 19 is an illustrative functional block diagram of the multimedia console 114 shown in FIGS. 1 and 2. The multimedia console 114 has a central processing unit (CPU) 1901 having a level 1 cache 1902, a level 2 cache 1904, and a Flash ROM (Read Only Memory) 1906. The level 1 cache 1902 and the level 2 cache 1904 temporarily store data and hence reduce the number of memory access cycles, thereby improving processing speed and throughput. The CPU 1901 may be configured with more than one core, and thus, additional level 1 and level 2 caches 1902 and 1904. The Flash ROM 1906 may store executable code that is loaded during an initial phase of a boot process when the multimedia console 114 is powered ON.

A graphics processing unit (GPU) 1908 and a video encoder/video codec (coder/decoder) 1914 form a video processing pipeline for high speed and high resolution graphics processing. Data is carried from the GPU 1908 to the video encoder/video codec 1914 via a bus. The video processing pipeline outputs data to an A/V (audio/video) port 1940 for transmission to a television or other display. A memory controller 1910 is connected to the GPU 1908 to facilitate processor access to various types of memory 1912, such as, but not limited to, a RAM.

The multimedia console 114 includes an I/O controller 1920, a system management controller 1922, an audio processing unit 1923, a network interface controller 1924, a first USB (Universal Serial Bus) host controller 1926, a second USB controller 1928, and a front panel I/O subassembly 1930 that are preferably implemented on a module 1918. The USB controllers 1926 and 1928 serve as hosts for peripheral controllers 1942(1) and 1942(2), a wireless adapter 1948, and an external memory device 1946 (e.g., Flash memory, external CD/DVD ROM drive, removable media, etc.). The network interface controller 1924 and/or wireless adapter 1948 provide access to a network (e.g., the Internet, home network, etc.) and may be any of a wide variety of various wired or wireless adapter components including an Ethernet card, a modem, a Bluetooth module, a cable modem, or the like.

System memory 1943 is provided to store application data that is loaded during the boot process. A media drive 1944 is provided and may comprise a DVD/CD drive, hard drive, or other removable media drive, etc. The media drive 1944 may be internal or external to the multimedia console 114. Application data may be accessed via the media drive 1944 for execution, playback, etc. by the multimedia console 114. The media drive 1944 is connected to the I/O controller 1920 via a bus, such as a Serial ATA bus or other high speed connection (e.g., IEEE 1394).

The system management controller 1922 provides a variety of service functions related to assuring availability of the multimedia console 114. The audio processing unit 1923 and an audio codec 1932 form a corresponding audio processing pipeline with high fidelity and stereo processing. Audio data is carried between the audio processing unit 1923 and the audio codec 1932 via a communication link. The audio processing pipeline outputs data to the A/V port 1940 for reproduction by an external audio player or device having audio capabilities.

The front panel I/O subassembly 1930 supports the functionality of the power button 1950 and the eject button 1952, as well as any LEDs (light emitting diodes) or other indicators exposed on the outer surface of the multimedia console 114. A system power supply module 1936 provides power to the components of the multimedia console 114. A fan 1938 cools the circuitry within the multimedia console 114.

The CPU 1901, GPU 1908, memory controller 1910, and various other components within the multimedia console 114 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 114 is powered ON, application data may be loaded from the system memory 1943 into memory 1912 and/or caches 1902 and 1904 and executed on the CPU 1901. The application may present a graphical user interface that provides a consistent user experience when navigating to different media types available on the multimedia console 114. In operation, applications and/or other media contained within the media drive 1944 may be launched or played from the media drive 1944 to provide additional functionalities to the multimedia console 114.

The multimedia console 114 may be operated as a standalone system by simply connecting the system to a television or other display. In this standalone mode, the multimedia console 114 allows one or more users to interact with the system, watch movies, or listen to music. However, with the integration of broadband connectivity made available through the network interface controller 1924 or the wireless adapter 1948, the multimedia console 114 may further be operated as a participant in a larger network community.

When the multimedia console 114 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 114 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1901 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1942(1) and 1942(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Figure 20:
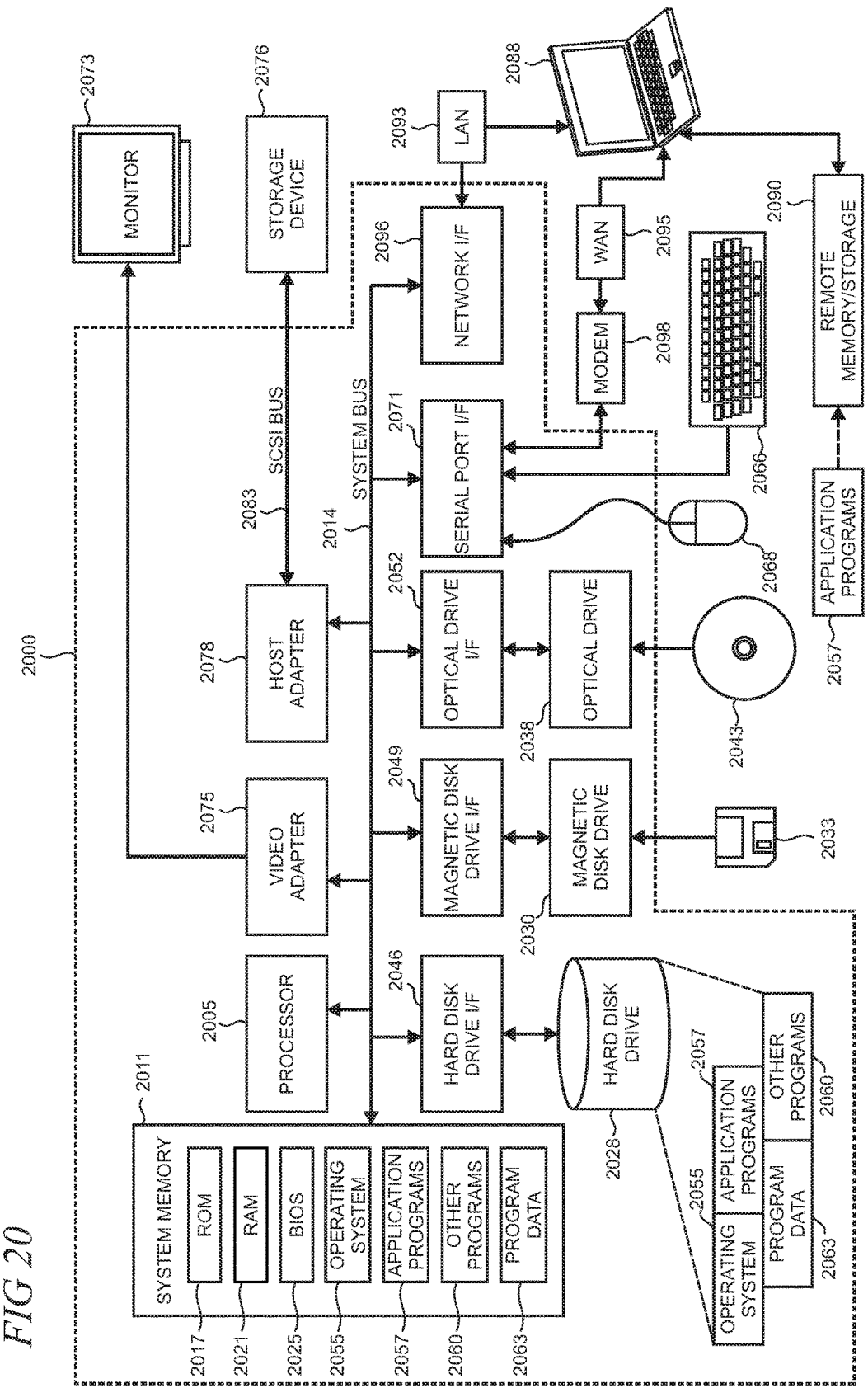
FIG. 20 is a simplified block diagram of an illustrative computer system such as a personal computer (PC) that may be used in part to implement the present volumetric dynamic virtual cameras.

FIG. 20 is a simplified block diagram of an illustrative computer system 2000 such as a PC, client device, or server with which the present volumetric dynamic virtual cameras may be implemented. Computer system 2000 includes a processing unit 2005, a system memory 2011, and a system bus 2014 that couples various system components including the system memory 2011 to the processing unit 2005. The system bus 2014 may be any of several types of bus structures including a memory bus or memory controller, a peripheral bus, and a local bus using any of a variety of bus architectures. The system memory 2011 includes read only memory ("ROM") 2017 and random access memory ("RAM") 2021. A basic input/output system ("BIOS") 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer readable storage media provide non-volatile storage of computer readable instructions, data structures, program modules, and other data for the computer system 2000. Although this illustrative example shows a hard disk, a removable magnetic disk 2033, and a removable optical disk 2043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present volumetric dynamic virtual cameras. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 2005 through a serial port interface 2071 that is coupled to the system bus 2014, but may be connected by other interfaces, such as a parallel port, game port, or USB. A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface ("SCSI") bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network ("LAN") 2093 and a wide area network ("WAN") 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of volumetric dynamic virtual cameras. It may be desirable and/or advantageous to enable other types of computing platforms other than the multimedia console 112 to implement the present volumetric dynamic virtual cameras in some applications.

Figure 21:
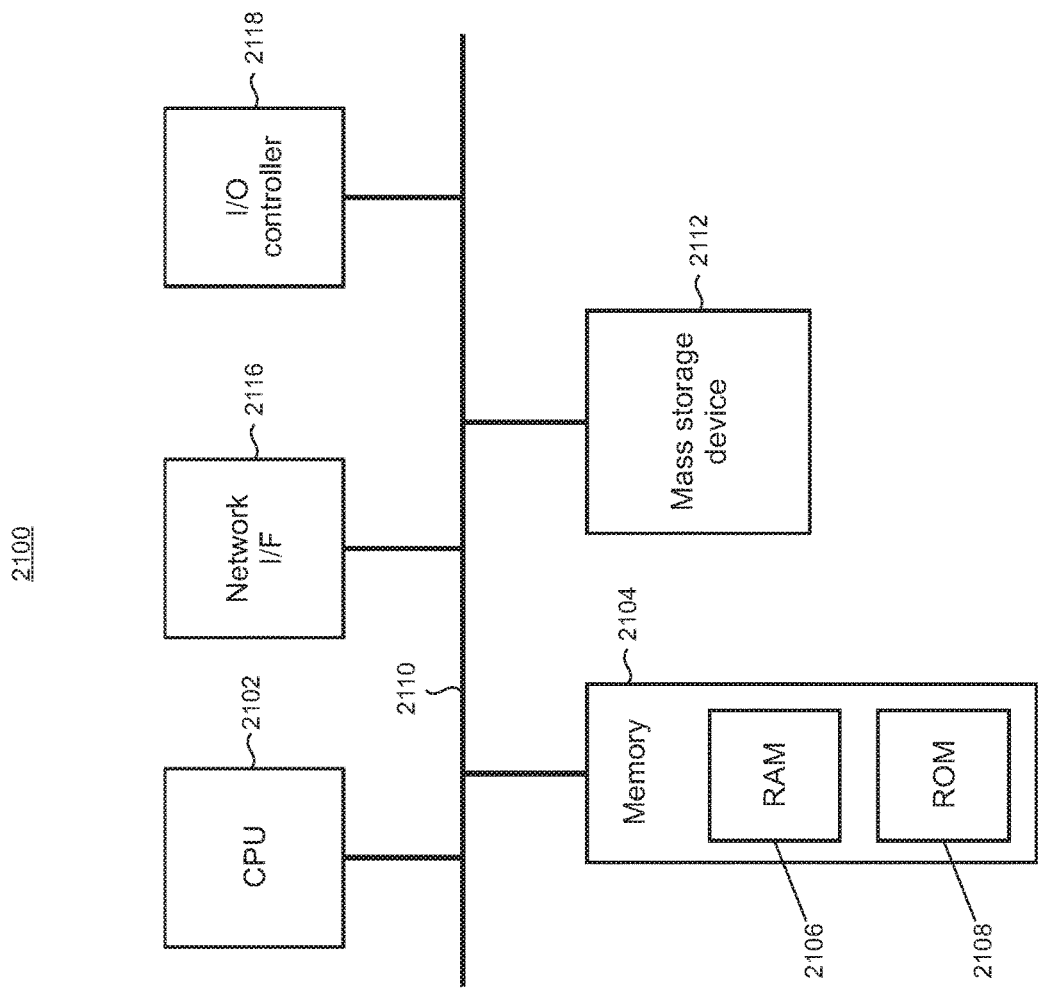
FIG. 21 shows a block diagram of an illustrative computing platform that may be used in part to implement the present volumetric dynamic virtual cameras.

FIG. 21 shows an illustrative architecture 2100 for a computing platform or device capable of executing the various components described herein for implementing volumetric dynamic virtual cameras. Thus, the architecture 2100 illustrated in FIG. 21 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2100 may be utilized to execute any aspect of the components presented herein.

The architecture 2100 illustrated in FIG. 21 includes a CPU 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100. Although the description of computer-readable storage media contained herein refers to a mass storage device, such as a hard disk or CD-ROM drive, it should be appreciated by those skilled in the art that computer-readable media can be any available computer storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It should be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 21). Similarly, the input/output controller 2118 may provide output to a display screen, a printer, or other type of output device (also not shown in FIG. 21).

It should be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2100 in order to store and execute the software components presented herein. It also should be appreciated that the architecture 2100 may include other types of computing devices, including hand-held computers, embedded computer systems, smartphones, PDAs, and other types of computing devices known to those skilled in the art. It is also contemplated that the architecture 2100 may not include all of the components shown in FIG. 21, may include other components that are not explicitly shown in FIG. 21, or may utilize an architecture completely different from that shown in FIG. 21.

Based on the foregoing, it should be appreciated that technologies for volumetric dynamic virtual cameras have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more hardware-based computer-readable memory devices storing instructions which, when executed by one or more processors disposed in an electronic device, implement a camera system used in a virtual three-dimensional (3D) game space and further cause the electronic device to:
receive a training dataset that maps respective virtual player positions in a convex hull in the virtual 3D space to corresponding sets of camera parameters, the convex hull being fitted to sample points in a camera sample dataset;
receive a current position of a virtual player in the convex hull during game runtime;
interpolate data in the training dataset to generate interpolated camera parameters for the current virtual player position;
receive a current position of the virtual player in the virtual 3D space that is external to the convex hull;
extrapolate the data in the training dataset to generate extrapolated camera parameters for the current virtual player position;
send either the interpolated camera parameters or the extrapolated camera parameters to a camera system so that the camera system can capture scenes in the virtual 3D game space in accordance with either the interpolated camera parameters or the extrapolated camera parameters.

2. The one or more computer-readable memory devices of claim 1 in which the instructions further cause the electronic device to configure a radial basis function (RBF) algorithm to perform the interpolating and extrapolating.

3. The one or more computer-readable memory devices of claim 2 in which the RBF algorithm is further configured to receive a dimensionality as an additional input, the dimensionality including at least one of player facing, player direction, player movement, or application context.

4. The one or more computer-readable memory devices of claim 1 in which the instructions further cause the electronic device to configure the camera system to be volumetric.

5. The one or more computer-readable memory devices of claim 1 in which the instructions further cause the electronic device to use the interpolated or extrapolated camera parameters as interactive parameters in an interactive camera.

6. The one or more computer-readable memory devices of claim 1 in which the camera parameters include at least one of position, direction, rotation, field of view, or player offset.

7. A computing device configured to support an application configured to generate virtual scenes including a virtual player, comprising:
one or more processors; and
one or more hardware-based computer-readable memory devices storing instructions which, when executed by the one or more processors, cause the computing device to:
receive training data including a plurality of data pairs, each data pair including a trained virtual player position within a portion of a virtual 3D application space and an associated set of one or more trained camera parameters;
receive a current position of the virtual player in the virtual 3D application space;
use a radial basis function (RBF) to interpolate the training data in view of the current position to generate runtime camera parameters; and
output the runtime camera parameters to a virtual camera system which captures, in accordance with the camera parameters, a scene of a portion of the virtual 3D application space that includes the virtual player in the current position during application runtime.

8. The computing device of claim 7 wherein the current position of the virtual player in the virtual 3D application space is controlled by a user of the application during application runtime.

9. The computing device of claim 7 wherein a portion of the virtual 3D application space is a convex hull fitted to a camera sample dataset and the RBF is further configured to generate the runtime camera parameters by extrapolating the training data for a position of the player that is external to the convex hull.

10. The computing device of claim 6 wherein the training data comprises a sparse dataset.

11. The computing device of claim 7 in which the instructions further cause the computing device to operate the virtual camera system in combination with other camera types, the other camera types including one of fully interactive, user-controlled, orbital, or free.

12. The computing device of claim 7 in which the RBF is further configured to receive a dimensionality as an additional input, the dimensionality including at least one of player facing, player direction, player movement, or application context.

13. The computing device of claim 7 further including a display device on which the captured scene is displayed and wherein the RBF and virtual camera system operate in an iterative manner so that the display device displays the player's movements as the player's position changes within the virtual 3D application space.

14. A method of operating a computing device that executes an application configured to render scenes occurring within a virtual three-dimensional (3D) application space, comprising:
 receiving a training dataset that includes camera parameters corresponding to respective training virtual player positions in the virtual 3D application space;
 implementing a radial basis function (RBF) algorithm that interpolates the training dataset to produce camera parameters for virtual player positions in the virtual 3D application space other than the training virtual player positions;
 receiving inputs from a computing device user that control positions of a virtual player within the virtual 3D application space during application runtime;
 using the camera parameters to operate a virtual camera system to capture respective scenes of the virtual player at controlled positions within the virtual 3D application space; and
 rendering the captured scenes for display by the computing device.

15. The method of claim 14 wherein a portion of the virtual 3D application space is a convex hull and further including implementing the RBF algorithm to extrapolate training data for a position of the virtual player that is external to the convex hull.

16. The method of claim 15 in which a subset of the camera parameters is disabled for extrapolation by the RBF algorithm.

17. The method of claim 15 in which the interpolation or extrapolation is performed in two dimensions or three dimensions.

18. The method of claim 15 further including rendering the scenes on a display screen and constraining the interpolation or extrapolation using one of spline constraint or screen composition constraint.

19. The method of claim 18 in which the RBF algorithm and virtual camera system operate in an iterative manner so that the display screen shows the virtual player's movements as controlled positions change in the virtual 3D application space.

20. The method of claim 14 in which the application is a video game.

* * * * *